June 15, 1926.
N. A. CHRISTENSEN
1,588,658
CONTROL FOR AIR BRAKES
Filed April 9, 1924 2 Sheets-Sheet 1
Fig. 1.
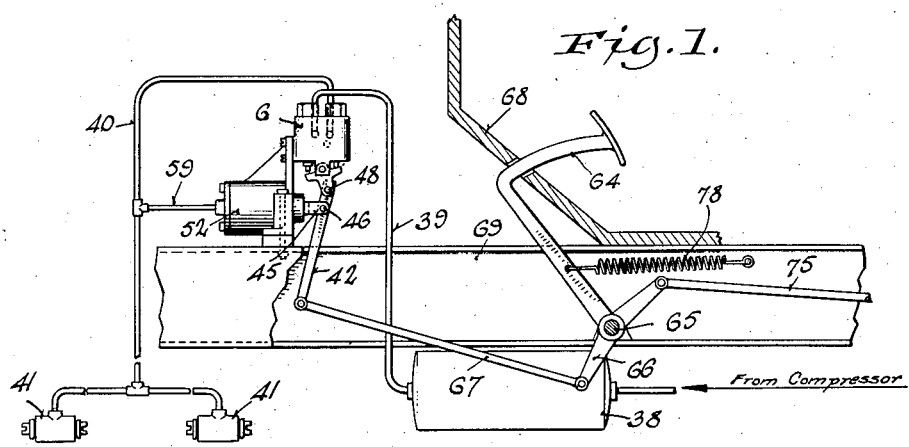
Fig. 2.
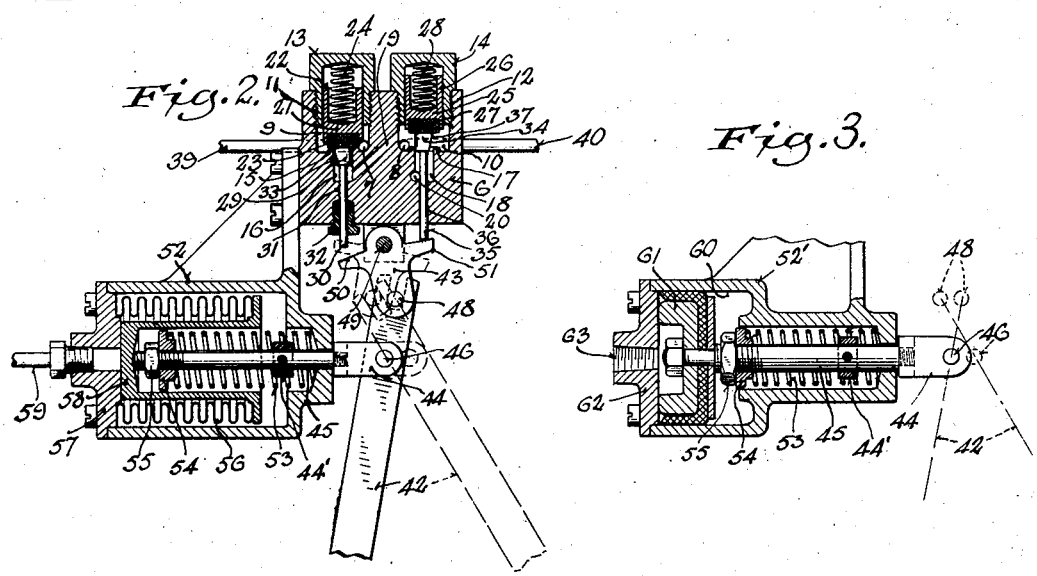
Fig. 3.
Fig. 4.
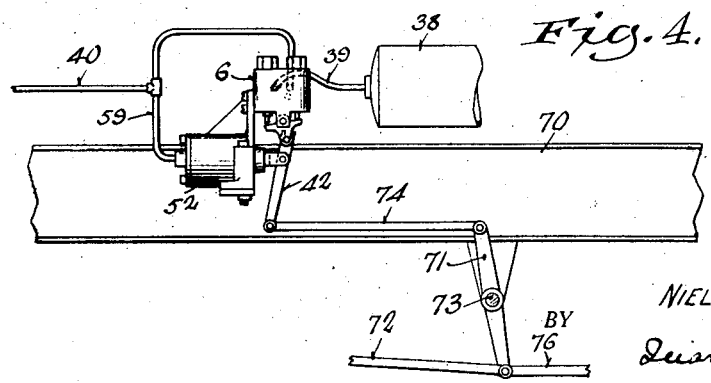
INVENTOR.
NIELS A. CHRISTENSEN
BY
Duerless French
ATTORNEYS.

June 15, 1926.
N. A. CHRISTENSEN
1,588,658
CONTROL FOR AIR BRAKES
Filed April 9, 1924
2 Sheets-Sheet 2
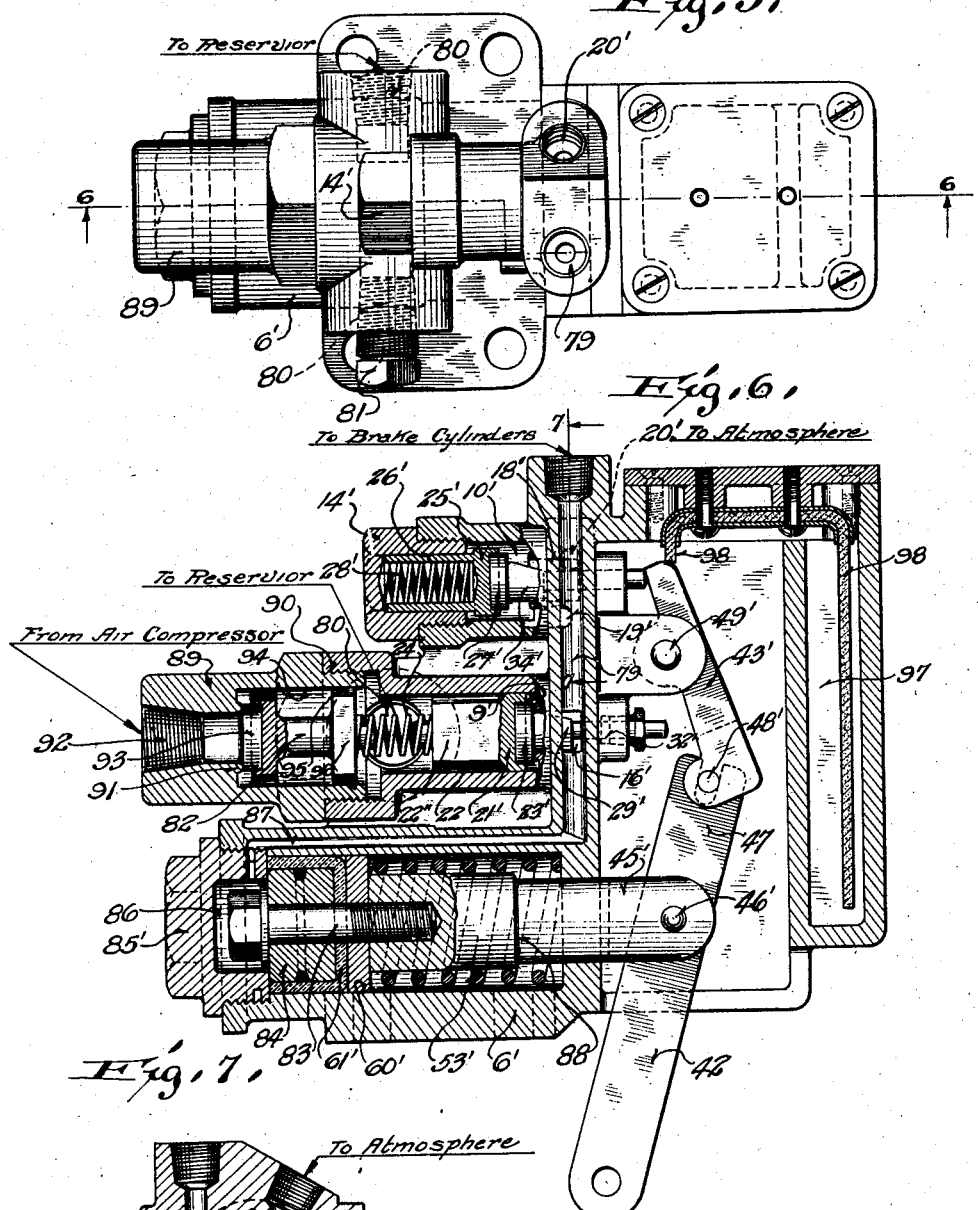
INVENTOR.
Niels A. Christensen
BY Quarles + French
ATTORNEYS.

Patented June 15, 1926.

1,588,658

UNITED STATES PATENT OFFICE.

NIELS A. CHRISTENSEN, OF MILWAUKEE, WISCONSIN.

CONTROL FOR AIR BRAKES.

Application filed April 9, 1924. Serial No. 705,363.

The invention relates to air-brake-control mechanism for braking systems, more particularly those used in connection with automotive vehicles and trailers for such vehicles.

The object of this invention is to provide an air-brake-control valve mechanism in which the braking pressure may be readily controlled by the operator of the vehicle so that said pressure may be readily varied by the operator to secure the desired brake application pressure, the control being more particularly designed for foot operation although not necessarily limited thereto, as it may also be operated by hand.

A further object of the invention is to provide a brake-control-valve mechanism in which a pressure is automatically built up in opposition to the movement of the control lever by the operator so that varying volumes of air may be admitted to the brake-cylinders while the control lever is given a unidirectional movement, the extent of movement determining the volume of air introduced into the brake system and hence the braking pressure of said system whereby the braking pressure may be controlled by the operator through a relatively wide range.

The invention further consists in the several features hereinafter set forth and more particularly defined by claims at the conclusion hereof.

In the drawings: Fig. 1 is an elevation view of brake-control-valve mechanism embodying the invention, showing it applied to an automotive vehicle and associated with the foot-pedal;

Fig. 2 is a detail sectional view of the control mechanism embodying the invention;

Fig. 3 is a detail sectional view showing a modified form of some of the parts shown in Fig. 2;

Fig. 4 is a view similar to Fig. 1 showing a different mounting for the device, and is associated with one of the brake levers moved by the foot-pedal;

Fig. 5 is a plan view of a modified arrangement of control mechanism;

Fig. 6 is a section taken on the line 6—6 of Fig. 5;

Fig. 7 is a detail sectional view taken on the line 7—7 of Fig. 6.

Referring to Figs. 2 and 3, the control valve mechanism includes a valve casing 6 having openings 7 and 8 therein leading to valve chambers 9 and 10. These chambers have tapped openings 11 and 12 receiving the lower threaded ends of box-nuts 13 and 14 which seal off the upper ends of said chambers.

A curved or beaded valve seat 15 is formed in the lower end of the chamber 9 adjacent a duct 16, and a similar seat 17 is formed in the lower end of the chamber 10 adjacent a duct 18. A duct 19 connects the duct 16 with the chamber 10. A relief duct 20 extends from the duct 17 through the casing to the atmosphere.

A poppet inlet valve 21 has a tubular portion 22 slidably mounted in the bore of the nut 13 and has a head 23 of composition material inset therein and held against the seat 15 by a spring 24 mounted in the bore of the portion 22 and interposed between the end of said bore and the upper end of the bore in the nut 13. A poppet relief valve 25 has a tubular portion 26 slidably mounted in the bore of the nut 14 and has a head 27 of composition material inset therein and held against the seat 17 by a spring 28 mounted in the bore of the portion 26 and interposed between the end of said bore and the upper end of the bore in the nut 14.

A push-pin 29 is slidably mounted in the bore formed by the duct 16 and has a stem portion 30 mounted in a reduced bore 31, which is preferably packed by a suitable stuffing-box 32, said stem projecting outside of the valve casing. The head of this pin engages the head 23 of the inlet valve 21 and fits closely in the bore with the exception of a wedge-shaped flat face 33 which gradually increases the effective port opening as this pin is pushed in toward the valve 21 by the application of the operating means.

A push-pin 34 is slidably mounted in the bore formed by the duct 18 and has a stem portion 35 mounted in a reduced bore 36, said stem projecting outside of the valve casing. The head of this pin engages the head 27 of the relief valve 25 and fits closely in the bore with the exception of a wedge-shaped face 37 which gradually increases the effective port opening as this pin is pushed in toward the valve 25 by the application of the operating means.

Compressed air from a supply tank 38 is conducted by piping 39 to the chamber 9 and brake-system piping 40 leads from the chamber 10 to one or more brake-cylinders 41 of the brake-system, which may be of any suitable construction and operatively associated with the wheel-brakes to operate them when the inlet valve 21 is opened, and air from the tank goes through piping 39 to chamber 9, through duct 19 to chamber 10 and thence to piping 40. After a brake application the relief valve 25 is opened allowing the air in the brake-system to escape through duct 20 to the atmosphere.

The means for operating these valves 21 and 25 by the movement of the pins 29 and 34 includes an operating lever 42 with means operable by air-brake pressure to shift the fulcrum point of said lever and a double bell-crank lever 43 operatively connected to said lever 42 and having parts engageable with the exposed ends of the stems of said pins.

The lever 42 is pivotally mounted intermediate its ends in the forked end 44 of a fulcrum shifting rod or support 45 to which it is connected by a pivot pin 46. The free end 47 of said lever 42 is slotted or forked to receive a pin 48 on the free end of the lever 43. This slotted connection between the levers 42 and 43 forms a lost motion connection between them which provides for a "lap" position of the valves. The lever 43 is pivotally mounted on a pin 49 on the casing 6 and has an arm 50 engageable with the stem 30 of the inlet-valve-operating pin 29 and an arm 51 engageable with the stem 35 of the relief-valve-operating pin 34 when the lever 42 is moved in the proper direction to bring one of these arms into contact with the operating-pin adjacent thereto. The shiftable support or rod 45 is slidably mounted in a casing 52 or 52' and is moved in one direction by a spring 53 interposed between the casing and a washer 54 held in adjusted position on said rod by a nut 55, and is moved in the opposite direction by brake pressure through a fluid-pressure-operated means, such as a multiple diaphragm or a suitably packed piston.

In Fig. 2 I show a diaphragm construction including a sylphon bellows 56 secured at one end to the end plate 57 of the casing 52 in a fluid-tight manner and secured at its other end, in a fluid-tight manner, to the flanged portion of a cap member 58 into which the rod 45 projects and with which it is in contact so that air in the brake-system may pass from the piping 40 through pipe 59 to the space enclosed by the sylphon and its cap and act against said cap to move the rod 45 in an opposite direction compressing the spring 53. In Fig. 3 the casing 52' is provided with a bore 60 in which a suitably packed piston 61 works, said piston being bolted or otherwise suitably connected to the rod 45, said casing having an end plate 62 with a tapped opening 63 therein to take the coupling for the pipe 59 so that air-brake pressure acting against said piston tends to move the rod 45 in an opposite direction from that of the spring 53. In each instance the outward travel of the shiftable support 44 is limited by a stop collar 44' pinned to said support and engageable with the housing 52 or 52'. It will be understood that the cap member 58 or the piston 61 may be made to abut against the casing to limit the outward travel of the support 44, if desired.

Normally when no pressure is applied to the operating lever 42, the relief valve 34 is held open by the engagement of the arm 51 of the lever 43 with the stem of said valve, said lever having been moved to this position and retained therein by the position of the operating lever 42 and by the spring 53 and the spring 78 which then holds the fulcrum point or pin 46 in one of its extreme positions, and in that position this fulcrum point is relatively fixed. If it is then desired to apply the brakes the lever 42 is swung from its full-line position in Fig. 2 toward its dotted line position, with the result that lever 43 swings out of operative connection with the pin 34, allowing relief valve 27 to close and comes into operative engagement with the pin 29 for the inlet valve 21 operating thereon to open said valve and allow compressed air from the tank 38 to enter the braking system. When the air enters the braking-system this air is also conducted to the piston or diaphragm chamber previously described and acts to shift the rod 45 outwardly against the action of the spring 53 and builds up a pressure sufficient to overcome it and cause a travel of the piston or diaphragm, and therefore the rod 45 associated therewith, outwardly in direct proportion to the intensity of the pressure in the braking-system, as related to the strength of the spring, and causes the fulcrum point for the operating lever 42 to move outwardly, the lower part of the lever being held in position by the operator either directly or through connection with the foot-pedal. This outward shifting of the fulcrum causes the arm 50 of the lever 43 to be swung away from the inlet-valve-operating pin 29, thereby permitting the inlet valve 21 to close and the arm 51 to swing toward the operating pin 34 for the relief valve 27, but not to move said pin as the lever 43 is then in its "lap" position due to the lost motion between the ends of the lever 43 and the operating pins, and the levers 42 and 43 because of the pin-and-slot connection on the shifting of said fulcrum allow both valves 21 and 27 to retain their seats. Thus, on a certain limited swing of the operating lever 42 air is admitted to the brake-system and a certain braking pressure applied to the brakes through the pistons (not shown) operating in the brake-cylinders 41, and the operating means is in a "lap" position in which both valves are closed and neither is again opened except by direct manual application of the lever 42. If it is desired to increase the braking pressure the lower part of lever 42 is swung still farther away from the casing 52 or 52′ by pushing down still more on the foot-pedal or by hand operation, the fulcrum on the rod 45 remaining stationary during this operation because of the balance between the brake pressure and the spring pressure, and this movement will again cause the arm 50 of the lever 43 to open the inlet valve admitting more compressed air to the brake-system and augmenting the pressure therein so that the fluid-pressure-operated rod 45 is again moved outwardly to still further compress the spring 53, the tension of which is constantly increasing as it is compressed, and said rod will move outwardly and cause the fulcrum point 46 for the lever 42 to again assume another position at this high pressure which will again cause a movement of the lever 43 to allow the inlet valve 21 to close without releasing the pressure in the brake-system while the lever 42 is retained in this position. Then further movement of lever 42 by the operator away from the casing 52 or 52′ further increases the braking pressure and in this way the pressure of air in the braking system may be controlled by the operator, and particularly from the foot-pedal since the more he pushes down on said pedal the more air is admitted to the brake-system and the greater the pressure becomes on the brakes so that the degree of braking pressure may be nicely controlled.

If the operator presses down on the foot-pedal 64, to its full extent of movement, it will be noted that the inlet valve 21 will then be held full open to establish maximum braking pressure in the brake-system, and that the shifting of the rod 44 until stop 44′ limits its outward travel will not act to release the inlet valve 21.

If it is desired to release the brake or the air from the braking-system to some extent, the operating lever 42 is allowed to swing backwards or toward the casing 52 or 52′, as by letting the foot-pedal move slightly backwards, which will cause the lever 43 to swing it arm 51 into engagement with the pin 34 for the relief valve 27 and thereby open said valve and let some of the pressure out of the brake-system and out of the fluid-pressure chamber containing the diaphragm or piston. The spring 53 will then gain supremacy and move the fulcrum point 46 into a position corresponding with the pressure at that point. To release the brake completely, the lever 42 is moved either through the foot-pedal or other means backwards its entire stroke, and the rod will then move back to normal position, the lever 43 will be moved to full release position holding open relief valve 27, and the braking pressure, and consequently the brakes, will then be fully released until the lever 42 is again operated.

As illustrative of one form of connection with the foot-pedal, I show in Fig. 1 a foot-pedal 64 pivoted at a fixed point 65 and carrying an arm 66 connected by a link 67 with the free end of the lever 42 so that downward pressure on said pedal 64 will swing the lever 42 toward the foot-board 68 to apply the brakes, as hereinbefore described. In this instance the control mechanism is mounted on the top of one of the side frame bars 69 of the chassis.

In Fig. 4 I show the control mechanism mounted on the side frame member 70 of the vehicle toward the rear thereof, and a brake-lever 71, suitably connected through operating linkage, including a link 72, with the foot-pedal, is pivoted at a fixed point 73 and connected by a link 74 to the free end of the lever 42 so that downward pressure on the foot-pedal will swing said lever 71 to a brake-application position and hence through the link 74 operate the brake-control mechanism, as previously described.

The foot-pedal, as usual, may also be connected to mechanical brakes, particularly for the rear wheels, in addition to the air-brakes for said wheels through operating connections including links 75 and 76.

The structure shown in Figs. 5 to 7, inclusive, operates in the same way as the structure shown in Figs. 2 and 3, and one difference is in the arrangement of the parts by which the fluid-pressure-operated means for shifting the fulcrum of the operating lever 42 is arranged in the same casing as that of the valves.

Briefly, this modification includes a casing 6′ having a relief valve chamber 10′, relief valve 25′ having parts 26′ and 27′ similar to parts 26 and 27 of relief valve 25 and similarly held in a normally closed position by the box-nut 14′ and the spring 28′, said valve controlling the passage of air from the duct 18′ to a duct 20′ leading to atmosphere and being operated by a pin 34′ similar in all respects to the pin 34. An inlet valve 21′ works in a chamber 9′ and controls passage of compressed air through a duct 16′ to a duct 79 which connects with the brake-system and by means of a duct 19′ with the chamber 10′, said valve having a head 23′ inset in a tubular portion 22′ having flattened sides 22″ so that the air may pass to the chamber 9′. The chamber 9′ forms a part of the bore in which the valve 21′ works and into which air is introduced from the reservoir through either one of two tapped openings 80, the other one being closed off by a pipe plug 81. Said valve 21' is normally held in a closed position by a spring 24' which is here shown interposed between said valve and the base of a check valve 82, said inlet valve being operated by a pin 29' similar in all respects to the pin 29, and having a packing 32' for its stem. The pins for the inlet valve 21' and the relief valve 25' are operated by a simple lever 43' pivotally mounted intermediate its ends between the stems of the pins, on a pin 49' carried by the casing 6, and said lever has the same kind of connection between it and the operating lever 42, that is, a pin 48' mounted between the forked ends of the lever 43' and engaged by the free slotted end 47 of said lever.

In the modified arrangement the lever 42 is again pivotally mounted on a shiftable support by a pin 46' carried by the piston rod 45' secured by a bolt 83 to the head 84 of a suitably packed piston 61' which works in a bore 60' of the casing 6' and cooperates therewith and with an end plug 85 to form a pressure chamber 86 which connects by a duct 87 with the duct 79, whereby the pressure of air in the brake system is used to shift the rod 45' and hence change the fulcrum point of the operating lever. As before, this pressure is counteracted by a spring 53' interposed between the inner end of the bore 60' and the piston head, and the piston is also limited in its movement by a shoulder 88 on said rod engageable with the inner end of the bore 60'.

In this construction also provision has been made to secure a compact arrangement and reduce the length of the piping, and the check valve 82, usually placed in the pipe line, is incorporated directly in the device by providing a fitting 89 having threaded connection with the enlarged threaded end 90 of the bore in which the valve 21' works, and having a valve seat 91 controlling the passage of compressed air from the compressor through inlet 92 to said bore and against which the composition head 93 of the valve 82 seats. The stem of the valve 82 is guided in the bore 94 of the fitting by having the enlarged base 95 of said stem in sliding contact therewith, said base having flattened portions 96 to permit the air from the compressor to pass to reservoir through the opening 80 in communication therewith.

Provision is also made in this construction for lubricating the operating means by providing a vertically disposed lubricating oil supply chamber 97 and a wick 98 hanging down into said chamber and extending over and down adjacent the lever 43' so that oil drawn out of said chamber by said wick will be rubbed onto the lever 43' and run over said lever and hence reach the lever 42 and its connection with the lever 43' and also reach the exposed ends of the valve-operating pins. The lever 42 may be connected up with the foot-pedal, as previously described in connection with Figs. 1 and 4, and similarly moved to cause the lever 43' to act on the valves 21' and 25' in the same way that lever 43 acts on the valves 21 and 25.

It will be understood from the foregoing description that by shifting the fulcrum of the operating lever for the control valve mechanism, that different intensities of brake-pressure may be obtained and that the device readily lends itself to sensitive operation by the foot of the operator.

It will be noted that the valves 21 or 28' and 25 or 25' are positively actuated by the lever 43 or 43' from the lever 42, and should the spring 53 or 53' for any reason fail or break, the valves may still be operated as under such conditions the stop 44' limiting the outward movement of the rod 44, or the shoulder 88 for the piston rod 45', still permits the lever 42 to operate to move the inlet valve to full open position when the foot-pedal is depressed, and the spring 78 associated with the foot-pedal returns it to a release position and hence acts to return the lever 42 to release position and consequently causes lever 43 or 43' to open the release valve when the operator takes his foot off the pedal 64.

I desire it to be understood that this invention is not to be limited to any particular form or arrangement of parts except in so far as such limitations are specified in the claims.

What I claim as my invention is:

1. In air-brake-control valve mechanism, the combination with the brake system, of a normally closed inlet valve controlling the supply of compressed air to said system, a relief valve to relieve the air pressure in said system, a spring tending to close said relief valve, means for operating said valves to control the pressure of air in said system including an operating member, means, operated by the pressure of the fluid in said brake-system, acting on said member to change its position during a brake application so that any given position of said operating member is related to the pressure then existing in the braking-system whereby the varying of the position of said operating member will vary the braking pressure in said system, and means acting on said operating member to effect the opening of said relief valve against said spring.

2. In air-brake-control valve mechanism, the combination with the brake-system, of a normally closed inlet valve to control the supply of compressed air to said system, a relief valve to control the release of air from said system, a spring tending to close said relief valve, means for operating said valves to control the pressure of air in said system including a pivoted operating member operatively associated with said valves, means actuated by the fluid-pressure within the system to shift the pivot point of said member and thereby vary its operative effect on said valves to vary the braking pressure in said system, and means acting on said operating member to effect the opening of said relief valve against said spring.

3. In air-brake-control valve mechanism, the combination with the brake-system, of a normally closed inlet valve to control the supply of compressed air to said system, a relief valve to control the release of air from said system, a spring tending to close said relief valve, a pivoted member operable to alternately open and close said valves, and operator-controlled means influenced by the pressure of air in said brake-system to move said member to open and close said inlet valve during a single brake application and to open said relief valve when not operating said inlet valve.

4. In air-brake-control valve mechanism, the combination with the brake system, of a normally closed inlet valve to control the supply of compressed air to said system, a relief valve to control the release of air from said system, a spring tending to close said relief valve, an operating member associated with said valves to control their operation, means actuated by the operator of the vehicle to move said operating member to open the inlet valve and to control the opening of said relief valve, a shiftable support for said operating member, fluid-pressure-operated means for shifting said support in a direction to move said operating member so as to cause said inlet valve to close, and spring means acting upon said shiftable support in opposition to said fluid-pressure to shift said support in the opposite direction and to move said operating member to cause opening of said relief valve.

5. In air-brake-control valve mechanism, the combination with a brake-system, of a normally closed inlet valve to control the supply of compressed air to said system, a relief valve to control the release of air from said system, a spring tending to close said relief valve, means for operating said valves to control the pressure of air in said system including a pivoted operator-actuated member operatively associated with said valves, and means, influenced by the pressure in the brake system, for moving said member to shift its pivot point and thereby vary its operative effect upon said valves during its operation by the operator to vary the braking pressure in said system.

6. In an air-brake-control valve mechanism, the combination with the brake-system, of a normally closed inlet valve to control the supply of air to said system, a relief valve to control the release of air from said system, a spring tending to close said relief valve, a lever associated with said valves to alternately open and close them, an operating member for said lever having a lost motion connection therewith, and means for varying the position of said operating member in relation to the braking pressure of the system to vary the operative relation of said lever with said valves and thereby vary the pressure of the air in said braking-system.

7. In air-brake-control valve mechanism, the combination with a brake-system, of a normally closed inlet valve to control the supply of air to said system, a relief valve to control the release of air from said system, a spring tending to close said relief valve, a lever associated with said valves to alternately open and close them, a shiftable support, an operating member pivotally carried by said support and having a lost motion connection with said lever, and means for varying the position of said support during the operation of said operating member to vary the operative relation of said lever with said valves and thereby vary the pressure of the air in said braking-system.

8. In air-brake-control valve mechanism, the combination with the brake-system, of spring closed inlet and relief valves for said system, pins for operating said valves, a lever alternately engageable with said pins, an operating member having lost motion connection with said lever, a shiftable pivotal support for said operating member, means, actuated by the fluid-pressure in the brake-system, for shifting said support in one direction, and spring means for shifting said support in the opposite direction and normally acting to move said member and lever to open said relief valve.

9. In air-brake-control valve mechanism, the combination with the brake system, of spring closed inlet and relief valves for said system, means including a lever for operating said valves, an operating member having a lost motion connection with said lever, a shiftable pivotal support for said operating member, means, actuated by the fluid pressure in the brake-system, for shifting said support in one direction, and means for shifting said support in the opposite direction and normally acting to move said member and lever to open said relief valve.

10. In air-brake-control valve mechanism, the combination with the brake-system, of spring closed inlet and relief valves for said system, means including a lever for operating said valves, an operating member having a lost motion connection with said lever, a shiftable pivotal support for said operating member, a foot-pedal operatively connected to said member independent of said support for moving the same irrespective of the shifting movement of said support, means, actuated by the fluid-pressure in the brake-system, for shifting said support in one direction, and means for shifting said support in the opposite direction and normally acting to move said member and lever to open said relief valve.

11. In air-brake-control valve mechanism, the combination with the brake-system, of a normally closed inlet valve controlling the supply of compressed air to said system, a spring closed relief valve to control the release of air from said system, a member operable to alternately open and close said valves, and means acting on said member to open said relief valve and when moved by the operator and influenced by the pressure of air in said brake-system to move said member to open and close said inlet valve independently of said relief valve and to maintain said member in a lap position during a brake application thereby maintaining a certain braking pressure in said system.

12. In air-brake-control valve mechanism, the combination with the brake system, of a normally closed inlet valve controlling the supply of compressed air to said system, a spring closed relief valve to control the release of air from said system, means for controlling said valves including interconnected levers, and fluid-pressure-operated means for moving said levers to a lap position when a certain pressure is established in said brake-system by the operator's movement of said levers.

13. In air-brake-control valve mechanism, the combination with the brake-system, of a normally closed inlet valve controlling the supply of compressed air to said system, a spring closed relief valve to control the release of air from said system, operating means for said valves, and fluid-pressure-operated means for moving said operating means to a lap position on a predetermined movement of said operating means by the operator for a brake application whereby a certain braking pressure is established in said system.

14. In air-brake-control valve mechanism, the combination with the brake system, of a normally closed inlet and a spring-closed relief valve for said system, means including a lever for operating said valves, an operating member operatively connected with said lever, a shiftable pivotal support for said operating member, means, actuated by the fluid-pressure in the brake-system, for shifting said support in one direction, and means for limiting the shifting movement of said support in that direction.

15. In air-brake-control valve mechanism, the combination with the brake-system, of a casing, a check valve and spring closed inlet and relief valves in said casing, said check valve controlling the passage of air from the compressor to a passage in said casing leading to the reservoir, said inlet valve controlling the passage of compressed air to the brake-system, and means for alternately opening and closing said inlet and relief valves.

16. In air-brake-control mechanism, the combination with the brake-system, of a casing, inlet and relief valves in said casing for controlling the passage of air to and from the brake-system, operating means for said valves, a lubricant supply chamber, and a wick extending into said chamber for supplying said operating means with lubricant.

In testimony whereof, I affix my signature.

NIELS A. CHRISTENSEN.